US012744321B2

(12) United States Patent
Hosotani et al.

(10) Patent No.: US 12,744,321 B2
(45) Date of Patent: Sep. 22, 2026

(54) SHORT-RANGE WIRELESS COMMUNICATION DEVICE

(71) Applicant: Murata Manufacturing Co., Ltd., Kyoto-fu (JP)

(72) Inventors: Tatsuya Hosotani, Nagaokakyo (JP); Takahiro Nagai, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 127 days.

(21) Appl. No.: 18/415,509

(22) Filed: Jan. 17, 2024

(65) Prior Publication Data

US 2024/0154307 A1 May 9, 2024

Related U.S. Application Data

(63) Continuation of application No. PCT/JP2022/027792, filed on Jul. 15, 2022.

(30) Foreign Application Priority Data

Jul. 27, 2021 (JP) ................................ 2021-122388

(51) Int. Cl.
*H01Q 7/00* (2006.01)
*H04B 5/26* (2024.01)
(Continued)

(52) U.S. Cl.
CPC ................ *H01Q 7/00* (2013.01); *H04B 5/26* (2024.01); *H04B 5/43* (2024.01)

(58) Field of Classification Search
None
See application file for complete search history.

(56) References Cited

U.S. PATENT DOCUMENTS 10,176,415 B2 1/2019 Wendling
2012/0193995 A1* 8/2012 Kanno ............... H02J 7/00034 307/104

(Continued)

FOREIGN PATENT DOCUMENTS

JP 2011134049 A * 7/2011
JP 5013019 B1 8/2012

(Continued)

OTHER PUBLICATIONS

International Search Report issued in PCT/JP2022/027792; mailed Oct. 11, 2022.

*Primary Examiner* — Anh Q Tran
(74) *Attorney, Agent, or Firm* — Studebaker Brackett PLLC

(57) ABSTRACT

A short-range wireless communication device includes a receiving circuit, a power-receiving circuit, a short-range wireless communication IC, a rectifier circuit, and a load circuit. The receiving circuit and the power-receiving circuit have a common circuit portion composed of a coil, a capacitor, and a capacitor. The coil and the capacitor constitute a first parallel resonance circuit, and the coil, the capacitor, and the capacitor constitute a second parallel series resonance circuit. The first parallel resonance circuit and the second parallel series resonance circuit function as impedance adjusting circuits, an output impedance of the receiving circuit is adjusted to be higher than or equal to a first predetermined value for realizing load modulation and an output impedance of the power-receiving circuit is adjusted to be lower than or equal to a second predetermined value for realizing power supply, and operations of the receiving circuit and the power-receiving circuit are realized.

17 Claims, 11 Drawing Sheets

(51) Int. Cl.
*H04B 5/43* (2024.01)
*H04B 5/79* (2024.01)

(56) References Cited

U.S. PATENT DOCUMENTS

| | | | | |
|---|---|---|---|---|
| 2015/0280453 | A1* | 10/2015 | Ikefuji | H04B 5/79<br>320/108 |
| 2017/0005399 | A1* | 1/2017 | Ito | G06K 7/10168 |

FOREIGN PATENT DOCUMENTS

| | | | | |
|---|---|---|---|---|
| JP | 5077476 | B1 | 11/2012 | |
| JP | 5168404 | B1 | 3/2013 | |
| JP | 2013-115981 | A | 6/2013 | |
| JP | 6244538 | B2 | 12/2017 | |
| WO | WO-2017145879 | A1 * | 8/2017 | H01F 38/14 |
| WO | 2021/131128 | A1 | 7/2021 | |
| WO | 2021/140692 | A1 | 7/2021 | |
| WO | WO-2021245980 | A1 * | 12/2021 | H02J 50/12 |

* cited by examiner

SHORT-RANGE WIRELESS COMMUNICATION DEVICE

CROSS-REFERENCE TO RELATED APPLICATIONS

This application claims benefit of priority to International Patent Application No. PCT/JP2022/027792, filed Jul. 15, 2022, and to Japanese Patent Application No. 2021-122388, filed Jul. 27, 2021, the entire contents of each are incorporated herein by reference.

BACKGROUND

Technical Field

The present disclosure relates to short-range wireless communication and a short-range wireless communication device that performs power reception.

Background Art

Japanese Patent No. 5013019, Japanese Patent No. 5077476, Japanese Patent No. 5168404 and Japanese Patent No. 6244538 describe non-contact charging modules. The non-contact charging modules of Japanese Patent No. 5013019, Japanese Patent No. 5077476, Japanese Patent No. 5168404 and Japanese Patent No. 6244538 have a wireless communication function. The non-contact charging modules of Japanese Patent No. 5013019, Japanese Patent No. 5077476, Japanese Patent No. 5168404 and Japanese Patent No. 6244538 separately include a coil for charging (for power reception) and an antenna for wireless communication.

U.S. Pat. No. 10,176,415 describes a passive RFID device. The passive RFID device of U.S. Pat. No. 10,176,415 has a power-receiving function. The passive RFID device of U.S. Pat. No. 10,176,415 receives power with the antenna for performing wireless communication. The passive RFID device of U.S. Pat. No. 10,176,415 includes a switch. A passive RFID described in U.S. Pat. No. 10,176,415 switches between wireless communication and power reception by flipping the switch.

SUMMARY

However, in the configurations of Japanese Patent No. 5013019, Japanese Patent No. 5077476, Japanese Patent No. 5168404 and Japanese Patent No. 6244538, the separate provision of the coil for charging (for power reception) and the antenna for wireless communication increases the number of components of the devices, making downsizing of the devices difficult. In the configuration of U.S. Pat. No. 10,176,415, wireless communication and power reception cannot be performed in parallel.

Accordingly, the present disclosure provides a short-range wireless communication device that realizes both operations of a receiving circuit and a power-receiving circuit by using a common coil and a common circuit in wireless communication and wireless power reception, and thus can efficiently execute the wireless communication and wireless power reception in parallel.

A short-range wireless communication device having a power-receiving function according to the present disclosure includes a power-receiving coil, a power-receiving resonance circuit, a wireless communication circuit, and a load circuit performing an operation using electric power. The power-receiving coil is used for both power reception in wireless power supply utilizing short-range radio and reception in wireless data communication utilizing the short-range radio. In the power-receiving resonance circuit, the power-receiving coil and two or more resonance capacitors constitute a resonance circuit. Each of the wireless communication circuit and the load circuit performing the operation using electric power is electrically connected with the power-receiving resonance circuit.

The power-receiving resonance circuit includes a receiving circuit that supplies a communication voltage to the wireless communication circuit from the power-receiving coil, and a power-receiving circuit that supplies a power-reception current to the load circuit from the power-receiving coil. The receiving circuit and the power-receiving circuit have a common circuit portion. Two or more resonance capacitors constituting the power-receiving resonance circuit include a first resonance capacitor and a second resonance capacitor in the common circuit portion. The first resonance capacitor is electrically connected in parallel to the power-receiving coil so as to constitute a first parallel resonance circuit together with the power-receiving coil. The first parallel resonance circuit performs a parallel resonance operation at a frequency of an alternating magnetic field of an outside. The second resonance capacitor is electrically connected in series to the power-receiving coil so as to constitute a second parallel series resonance circuit together with the power-receiving coil and the first resonance capacitor. The second parallel series resonance circuit performs a parallel series resonance operation at the frequency of the alternating magnetic field of the outside. The first parallel resonance circuit and the second parallel series resonance circuit function as impedance adjusting circuits. The impedance adjusting circuit adjusts and sets each output impedance so that a wireless-communication output impedance of the receiving circuit with respect to the wireless communication circuit is higher than or equal to a first predetermined value for realizing load modulation and a power-reception output impedance of the power-receiving circuit with respect to the load circuit is lower than or equal to a second predetermined value for realizing power supply, realizing both operations of the receiving circuit and the power-receiving circuit.

In this configuration, even when the power-receiving resonance circuit including the power-receiving coil is shared between the wireless communication circuit and the load circuit, the output impedance of the power-receiving circuit is adjusted to an impedance that can guarantee communication characteristics with respect to the wireless communication circuit and the output impedance of the receiving circuit is adjusted to an impedance that realizes a desired level of power supply with respect to the load circuit, by appropriately setting the capacitance (first capacitance) of the first resonance capacitor and the capacitance (second capacitance) of the second resonance capacitor. Accordingly, a voltage that can guarantee communication characteristics is supplied to the wireless communication circuit and a current that realizes a desired level of power supply is supplied to the load circuit.

According to the present disclosure, both operations of the receiving circuit and the power-receiving circuit can be realized by using a common coil and a common circuit in wireless communication and wireless power reception, the wireless communication and wireless power reception can be efficiently performed in parallel, and downsizing can be realized by reducing the components of the device.

BRIEF DESCRIPTION OF THE DRAWINGS

FIG. 5 is a graph illustrating a relation between output impedance of a receiving circuit and a power-receiving circuit and a first predetermined value (first threshold value) for load modulation and a second predetermined value (second threshold value) for power supply;

DETAILED DESCRIPTION

First Embodiment

Figure 1:
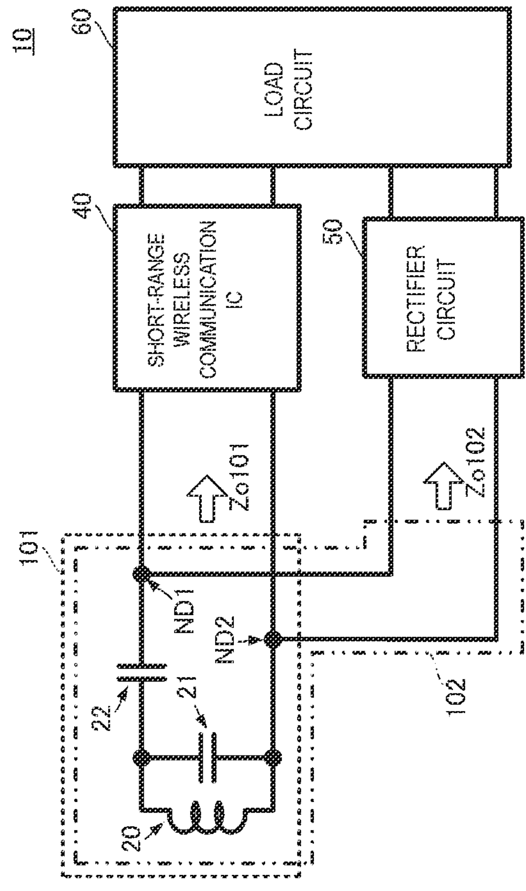
FIG. 1 is a functional block diagram illustrating a configuration of a short-range wireless communication device according to a first embodiment.

A short-range wireless communication device according to a first embodiment of the present disclosure will be described with reference to the accompanying drawings. FIG. 1 is a functional block diagram illustrating a configuration of the short-range wireless communication device according to the first embodiment.

As illustrated in FIG. 1, a short-range wireless communication device 10 includes a coil 20, a capacitor 21, a capacitor 22, a short-range wireless communication IC 40, a rectifier circuit 50, and a load circuit 60. The coil 20 corresponds to a "power-receiving coil" of the present disclosure. The capacitor 21 and the capacitor 22 constitute a "resonance capacitor" of the present disclosure. The capacitor 21 corresponds to a "first resonance capacitor" of the present disclosure and the capacitor 22 corresponds to a "second resonance capacitor" of the present disclosure. The short-range wireless communication IC 40 corresponds to a "wireless communication circuit" of the present disclosure. Further, a configuration portion composed of the rectifier circuit 50 and the load circuit 60 corresponds to a "load circuit" of the present disclosure.

The coil 20 is, for example, a loop coil. Both ends of the coil 20 are connected with the short-range wireless communication IC 40. The both ends of the coil 20 are also connected with the rectifier circuit 50.

A circuit connecting the short-range wireless communication IC 40 with the coil 20 and a circuit connecting the rectifier circuit 50 with the coil 20 include a pair of nodes ND1 and ND2.

The capacitor 21 is connected in parallel to the coil 20. In other words, one end of the capacitor 21 is connected with one end of the coil 20 and the other end of the capacitor 21 is connected with the other end of the coil 20.

The capacitor 22 is connected in series to the coil 20. More specifically, one end of the capacitor 22 is connected with one end of the coil 20 and the other end of the capacitor 22 is connected with the node ND1.

The short-range wireless communication IC 40 and the rectifier circuit 50 are connected with the load circuit 60.

The short-range wireless communication IC 40 is referred to as an NFCIC, for example, and performs communication using the coil 20.

The rectifier circuit 50 rectifies a current composed of an alternating current of a frequency received by the coil 20 so as to convert the current to a direct current, and outputs the direct current to the load circuit 60. The load circuit 60 performs a predetermined circuit operation by using an output voltage and an output current of the rectifier circuit 50. Here, an example of a specific circuit operation of the load circuit 60 will be described later.

Figure 2:
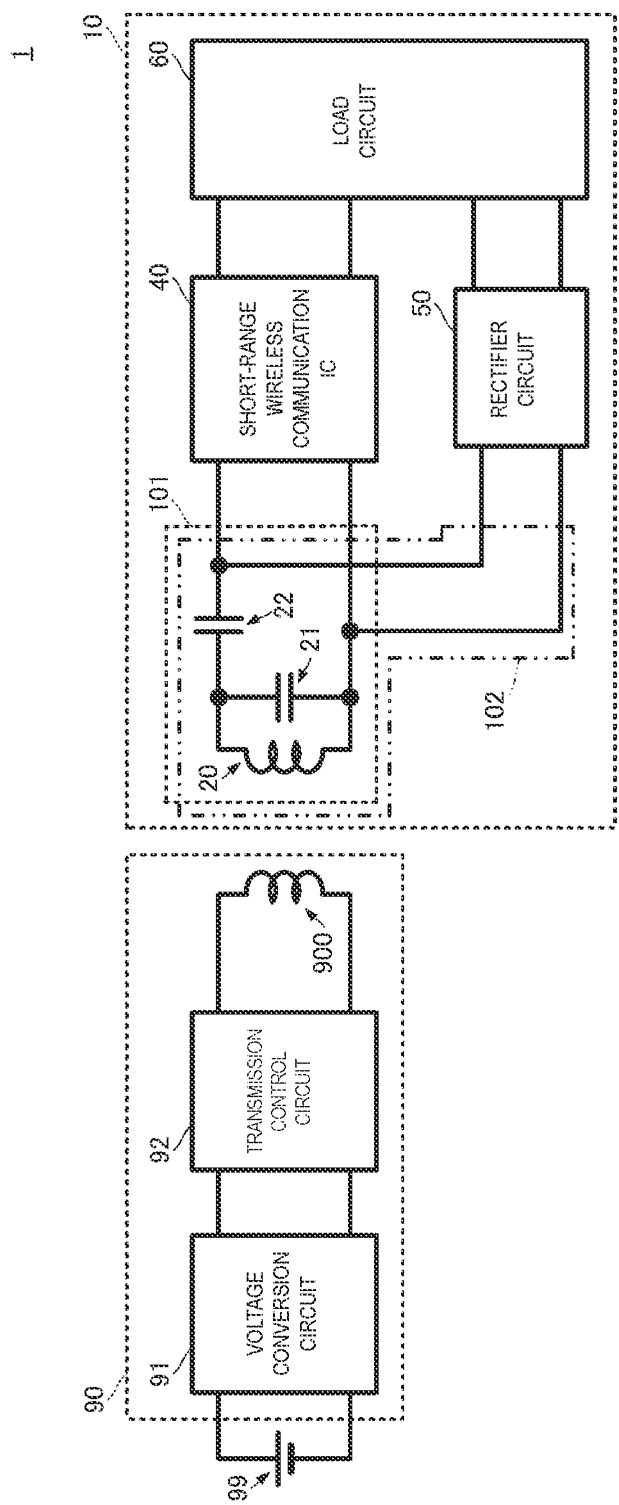
FIG. 2 is a functional block diagram illustrating a configuration of a short-range wireless communication system according to the first embodiment.

FIG. 2 is a functional block diagram illustrating a configuration of a short-range wireless communication system according to the first embodiment. As illustrated in FIG. 2, a short-range wireless communication system 1 includes a transmission device 90 and the short-range wireless communication device 10.

The transmission device 90 includes a voltage conversion circuit 91, a transmission control circuit 92, and a coil 900. The voltage conversion circuit 91 converts a voltage level of an input voltage from an external power source 99 and supplies the voltage to the transmission control circuit 92. The transmission control circuit 92 converts a DC voltage supplied from the voltage conversion circuit 91 into an AC voltage of a predetermined frequency and applies the AC voltage to the coil 900. The predetermined frequency in this case is, for example, 13.56 MHz of an ISM band. This frequency is an example and other frequencies may be employed.

The coil 900 is, for example, a loop coil. The coil 900 carries an alternating current corresponding to the applied AC voltage and generates an alternating magnetic field.

The short-range wireless communication device 10 is arranged so that the coil 20 is coupled with the alternating magnetic field generated by the coil 900. Accordingly, the coil 20 is electromagnetically induced with the alternating magnetic field generated by the coil 900 and generates an alternating current.

Here, the parallel circuit composed of the coil 20 and the capacitor 21 constitutes a first parallel resonance circuit (which corresponds to a "parallel resonance circuit" of the present disclosure). The first parallel resonance circuit performs a parallel resonance operation at a frequency of the external alternating magnetic field with which the coil 20 is coupled.

Further, the parallel series circuit composed of the capacitor 22, the capacitor 21, and the coil 20 constitutes a second parallel series resonance circuit (which corresponds to a "parallel series resonance circuit" of the present disclosure). The second parallel series resonance circuit performs a parallel series resonance operation at the frequency of the external alternating magnetic field with which the coil 20 is coupled.

Accordingly, a magnetic resonance state using the coil 20 and the coil 900 can be realized, suppressing a power supply loss caused by the electromagnetic field coupling between the coil 20 and the coil 900. In other words, power from the short-range wireless communication device 10 is supplied to the transmission device 90 with low loss.

As illustrated in FIGS. 1 and 2, the coil 20, the capacitor 21, and the capacitor 22 constitute a receiving circuit 101, and the receiving circuit 101 is connected with the short-range wireless communication IC 40, in the short-range wireless communication device 10. Further, the coil 20, the capacitor 21, and the capacitor 22 constitute a power-receiving circuit 102, and the power-receiving circuit 102 is connected with the rectifier circuit 50.

Thus, connection destinations of the receiving circuit 101 and the power-receiving circuit 102 are different from each other while the receiving circuit 101 and the power-receiving circuit 102 have a common circuit ("common circuit portion" of the present disclosure) which is a circuit portion composed of the coil 20, the capacitor 21, and the capacitor 22, in other words, a circuit portion closer to the coil 20 than the nodes ND1 and ND2.

A voltage and a current generated in the coil 20 are supplied through the receiving circuit 101 to the short-range wireless communication IC 40. Further, the current and the voltage generated in the coil 20 are supplied through the power-receiving circuit 102 to the rectifier circuit 50.

The short-range wireless communication IC 40 is capable of switching its own impedance state. Accordingly, a circuit composed of the receiving circuit 101 and the short-range wireless communication IC 40 is capable of switching a Q of resonance.

Figure 3A:
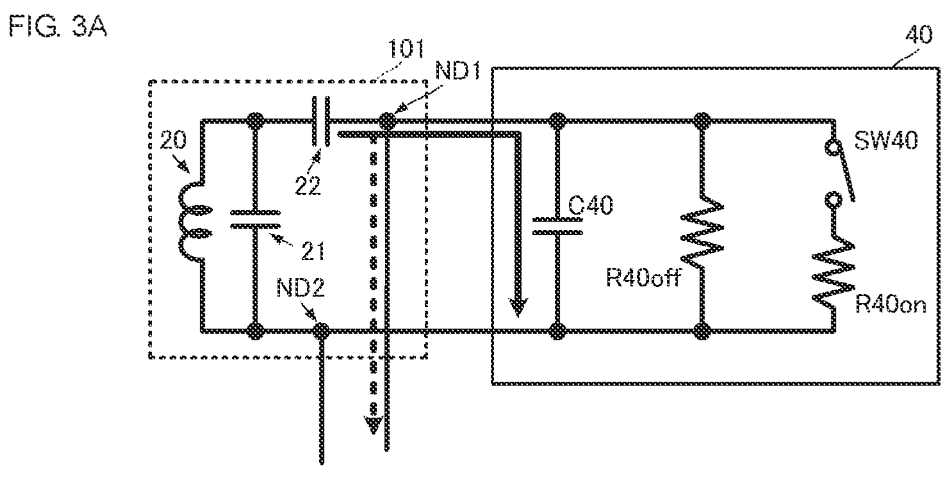
FIG. 3A and FIG. 3B are diagrams illustrating a concept of communication using a short-range wireless communication IC.
Figure 3B:
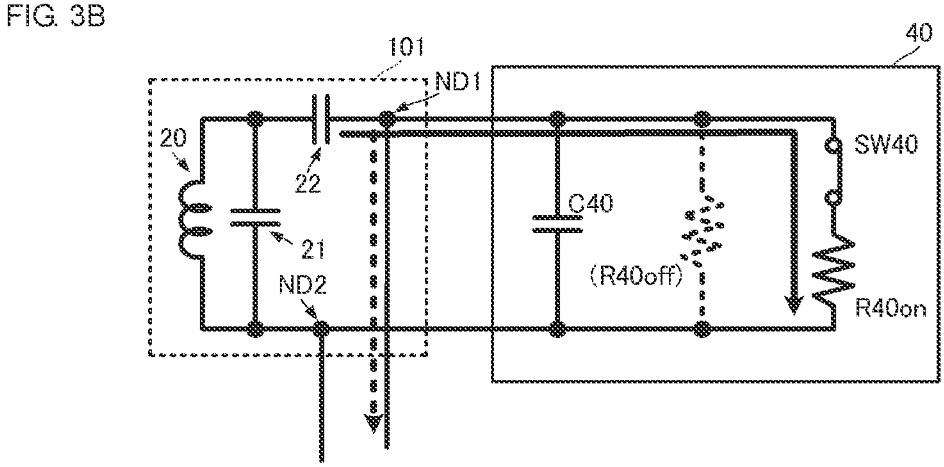

FIG. 3A and FIG. 3B are diagrams illustrating a concept of communication using the short-range wireless communication IC. FIG. 3A illustrates a state in which the Q of resonance is high, and FIG. 3B illustrates a state in which the Q of resonance is low.

As illustrated in FIG. 3A and FIG. 3B, the short-range wireless communication IC 40 includes a parallel circuit composed of a capacitor C40 and a switch SW40. The short-range wireless communication IC 40 does not limitedly have this configuration, but the short-range wireless communication IC 40 has the configuration illustrated in FIG. 3A and FIG. 3B as a minimal configuration for adjusting the Q of resonance even when including other circuit components.

The short-range wireless communication IC 40 turns the switch SW40 into an open state (off state) as a first state, as illustrated in FIG. 3A. In this state, a parallel circuit composed of an open resistance R40off of the switch SW40 and the capacitor C40 is formed in the short-range wireless communication IC 40. The open resistance R40off is very large and therefore, a current flowing from the coil 20 to the short-range wireless communication IC 40 flows into the capacitor C40 of the short-range wireless communication IC 40. As a result, the first state during communication between the receiving circuit 101 and the capacitor C40 is realized. In the first state, a current path contains no resistance component and therefore, the Q of resonance is high.

The short-range wireless communication IC 40 turns the switch SW40 into a conduction state (on state) as a second state, as illustrated in FIG. 3B. In this state, a parallel circuit composed of a conduction resistance R40on of the switch SW40 and the capacitor C40 is formed in the short-range wireless communication IC 40. The conduction resistance R40on is very small and therefore, a current flowing from the coil 20 to the short-range wireless communication IC 40 mainly flows into the conduction resistance R40on of the short-range wireless communication IC 40. As a result, the second state during communication between the receiving circuit 101 and the conduction resistance R40on is realized. In the second state, a current path contains a resistance component and therefore, the Q of resonance is low.

The circuit composed of the receiving circuit 101 and the short-range wireless communication IC 40 is thus capable of switching the Q of resonance.

By this switching of the Q of resonance, the short-range wireless communication device 10 realizes load modulation. That is, the short-range wireless communication device 10 switches the coupling state between the coil 20 and the coil 900 by switching the Q of resonance.

At this time, as illustrated with a dashed arrow in FIG. 3A and FIG. 3B, a stable current flows into the power-receiving circuit 102 irrespective of a resonance state between the receiving circuit 101 and the short-range wireless communication IC 40 (details will be described later).

The transmission control circuit 92 of the transmission device 90 includes a voltage monitoring unit (whose illustration is omitted). The voltage monitoring unit monitors an input voltage of the coil 900. When the coupling state between the coil 20 and the coil 900 is changed through switching of the Q of resonance by the short-range wireless communication device 10, as described above, the input voltage of the coil 900 is changed along with the change of the coupling state.

Figure 4A:
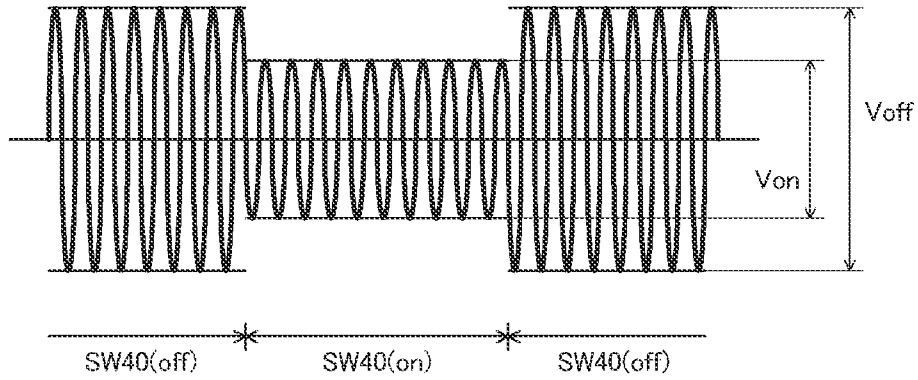
FIG. 4A and FIG. 4B are waveform diagrams illustrating an example of an input voltage.
Figure 4B:
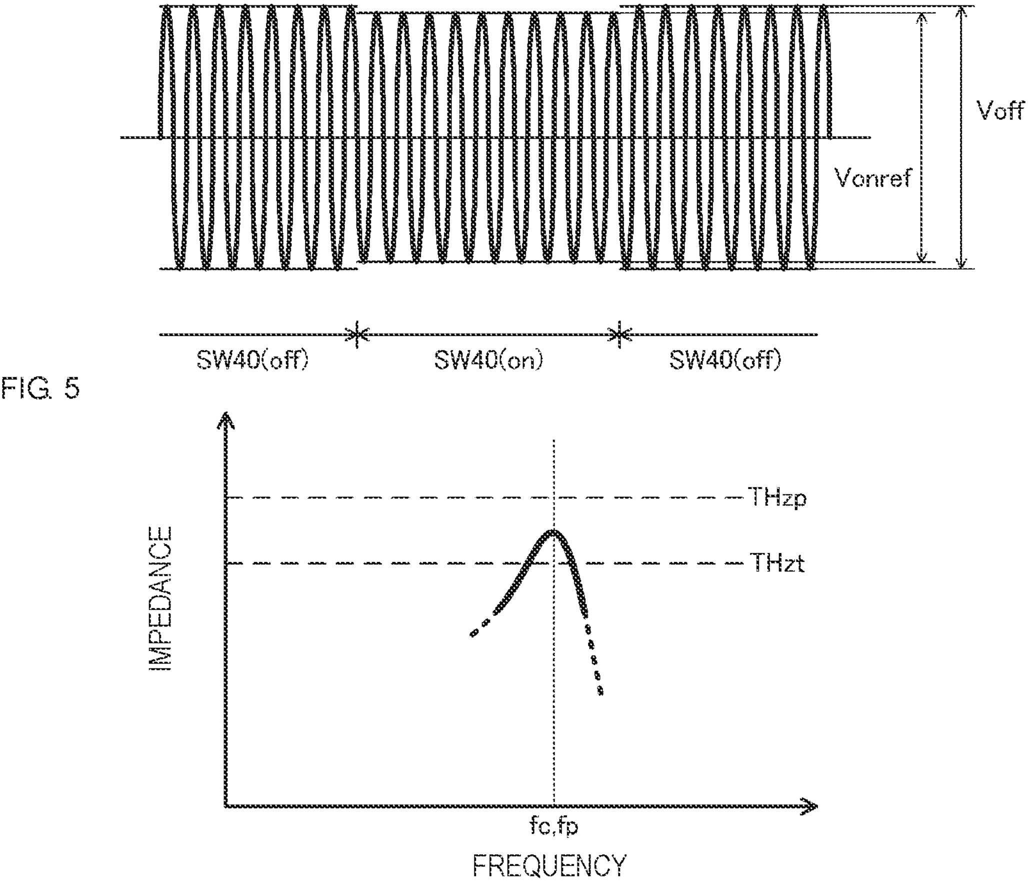

FIG. 4A and FIG. 4B are waveform diagrams illustrating an example of an input voltage. FIG. 4A illustrates the case of the disclosure of the present application, and FIG. 4B illustrates a case of a comparative example. The comparative example is, for example, an example in which parameter setting cannot be performed by an impedance adjusting circuit that is unique to the disclosure of the present application and will be described later.

In the open state (off state) of the switch SW40, the Q of resonance is high and the coil 20 and the coil 900 are in the resonance state, increasing an amplitude of an input voltage Voff as illustrated in FIG. 4A. In the conduction state (on state) of the switch SW40, the Q of resonance is low and the coupling degree between the coil 20 and the coil 900 is lowered, decreasing a current flowing through the coil 900 and decreasing an amplitude of an input voltage Von. Thus, the input voltage of the coil 900 is changed in response to the change of the opening state and conduction state of the switch SW40, that is, state transition. The voltage monitoring unit detects this change of input voltage.

The short-range wireless communication device 10 associates the bit of communication data with the change of the Q of resonance during data communication with the transmission device 90. The transmission device 90 can demodulate the bit of communication data by detecting the change in the input voltage of the coil 900.

Accordingly, the short-range wireless communication IC 40 of the short-range wireless communication device 10 and the transmission device 90 can realize transmission and reception of communication data, that is, wireless communication by utilizing the electromagnetic induction between the coil 900 and the coil 20.

In the short-range wireless communication device 10 and the short-range wireless communication system 1 described above, the short-range wireless communication device 10 further has the following features.

FIG. 5 is a graph illustrating a relation between output impedance of a receiving circuit and a power-receiving circuit and a first predetermined value (first threshold value) for load modulation and a second predetermined value (second threshold value) for power supply. In FIG. 5, the horizontal axis indicates frequency and the vertical axis indicates impedance (output impedance).

As described above, the receiving circuit 101 and the power-receiving circuit 102 have the common circuit portion, and an output impedance Zo101 of the receiving circuit 101 and an output impedance Zo102 of the power-receiving circuit 102 are basically the same as each other.

Further, at a frequency of the above-mentioned alternating magnetic field, in other words, at a communication frequency fc, the output impedance Zo101 of the receiving circuit 101 is higher than or equal to a first predetermined value THzt for load modulation, as illustrated in FIG. 5. Furthermore, at the frequency of the alternating magnetic field, in other words, at a power-receiving frequency fp, the output impedance Zo102 of the power-receiving circuit 102 is lower than or equal to a second predetermined value THzp for power supply.

Here, the output impedance Zo101 of the receiving circuit 101 and the output impedance Zo102 of the power-receiving circuit 102 can be adjusted by the common circuit portion of the receiving circuit 101 and the power-receiving circuit 102, that is, by the first parallel resonance circuit and the second parallel series resonance circuit.

On the other hand, the first parallel resonance circuit and the second parallel series resonance circuit perform a resonance operation at a frequency of the alternating magnetic field with which the coil 20 is coupled, as described above. That is, the first parallel resonance circuit and the second series parallel resonance circuit allow resonant frequencies of the receiving circuit 101 and the power-receiving circuit 102 to be matched to the frequency of the alternating magnetic field.

Accordingly, by appropriately setting respective element values (the inductance of the coil 20, the capacitance of the capacitor 21, the capacitance of the capacitor 22) of circuit elements constituting the first parallel resonance circuit and the second parallel resonance circuit, the resonant frequencies can be matched to the frequency of the alternating magnetic field and the output impedance Zo101 of the receiving circuit 101 and the output impedance Zo102 of the power-receiving circuit 102 can be adjusted within a predetermined impedance range. Namely, the first parallel resonance circuit and the second parallel series resonance circuit function as impedance adjusting circuits.

With the impedance adjusting circuit, the output impedance Zo101 of the receiving circuit 101 can be set higher than or equal to the first predetermined value THzt for load modulation, at the communication frequency (the frequency of the alternating magnetic field). Further, with the impedance adjusting circuit, the output impedance Zo102 of the power-receiving circuit 102 can be set lower than or equal to the second predetermined value THzp for power supply, at the power-receiving frequency (the frequency of the alternating magnetic field).

The first predetermined value THzt is an impedance at which a desired load modulation level can be realized. That is, the first predetermined value THzt is an impedance at which a predetermined level or higher Q of resonance can be obtained at the communication frequency.

Thus, the short-range wireless communication device 10 can appropriately set the state of high Q and the state of low Q of resonance between the receiving circuit 101 and the short-range wireless communication IC 40 at the communication frequency. As a result, the short-range wireless communication device 10 can realize excellent communication characteristics. More specifically, the short-range wireless communication device 10 can realize a high load modulation level.

For example, the first predetermined value THzt is set so that a change rate of the impedance of the receiving circuit 101 in load modulation can be set to 30% or higher, more preferably, approximately 50%. As a result, the short-range wireless communication device 10 can realize more excellent communication characteristics.

The second predetermined value THzp is an impedance at which desired power supply can be continuously realized. More specifically, the second predetermined value THzp is an impedance at which the power-receiving circuit 102 can continuously supply a desired value of current to the rectifier circuit 50.

Accordingly, the short-range wireless communication device 10 can stably supply a predetermined level or more current from the power-receiving circuit 102 to the rectifier circuit 50 at the power-receiving frequency.

With the above-described configuration of the present embodiment, the short-range wireless communication device 10 can perform power reception and reception (communication) in parallel. The short-range wireless communication device 10 can exhibit both excellent power-receiving characteristics and excellent communication characteristics.

The receiving circuit 101 and the power-receiving circuit 102 have the common circuit portion. Thus, the short-range wireless communication device 10 can be downsized with fewer components thereof.

In the above-described configuration, the capacitance of the capacitor 22 is preferably smaller than the capacitance of the capacitor 21. Accordingly, a resonant frequency can be mainly determined with the capacitor 21 and an output impedance can be finely adjusted with the capacitor 22. As a result, the short-range wireless communication device 10 can easily set a desired resonant frequency and a desired output impedance.

In the above-described configuration, the communication frequency fc and the power-receiving frequency fp are the same as each other. However, these frequencies may be different from each other. Even in this case, similar advantageous effect can be achieved as long as the output impedance Zo101 of the receiving circuit 101 at the communication frequency fc is higher than or equal to the first predetermined value for realizing load modulation and the output impedance Zo102 of the power-receiving circuit 102 at the power-receiving frequency is lower than or equal to the second predetermined value for realizing power supply.

Example of Application of Load Circuit 60

Figure 6:
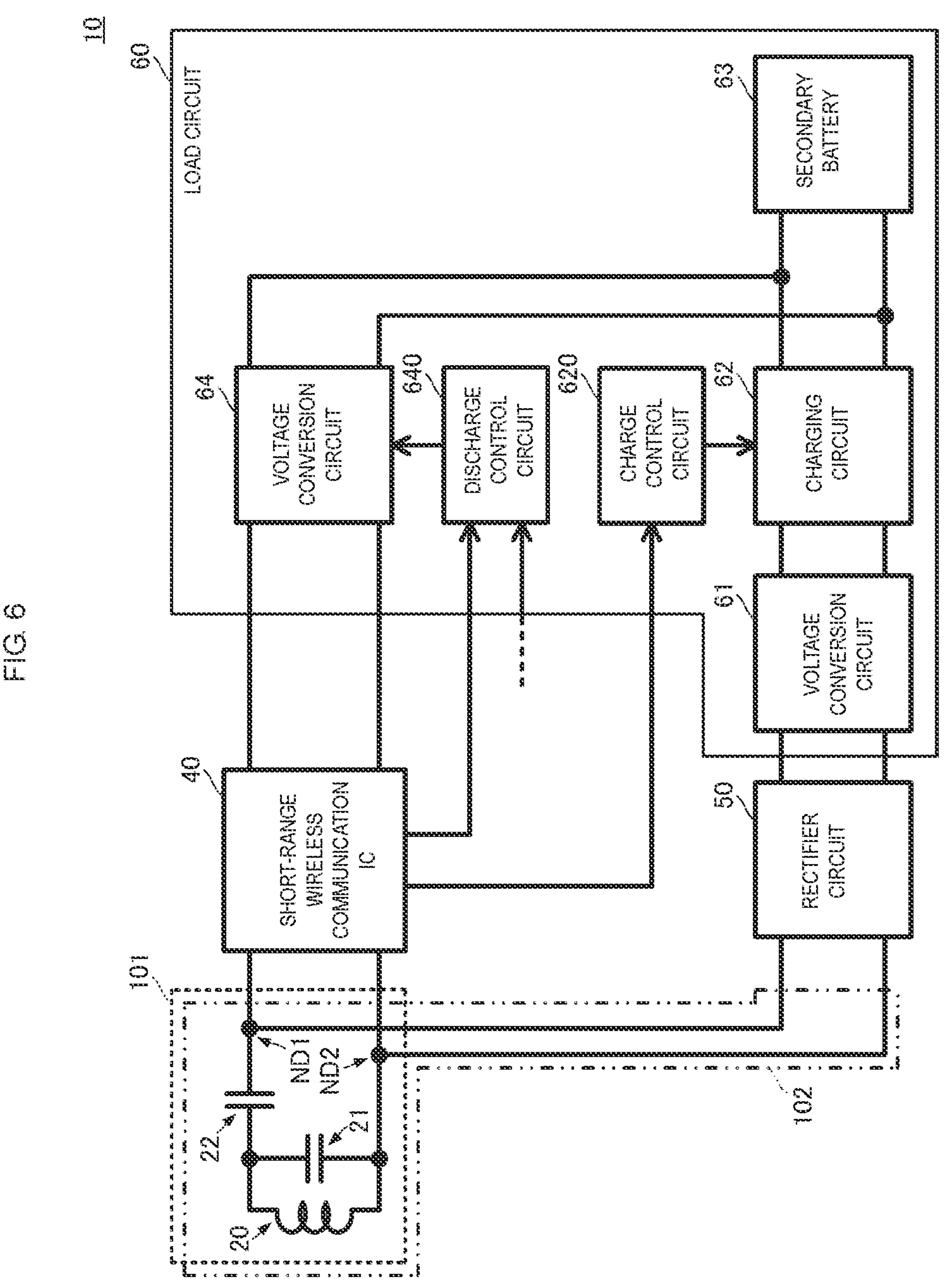
FIG. 6 is a functional block diagram illustrating a configuration example of a short-range wireless communication device including an example of a load circuit.

FIG. 6 is a functional block diagram illustrating a configuration example of a short-range wireless communication device including an example of a load circuit. In FIG. 6, the components of the short-range wireless communication device 10 other than the load circuit 60 have been described above, and new description of these components will be therefore omitted.

As illustrated in FIG. 6, the load circuit 60 includes a voltage conversion circuit 61, a charging circuit 62, a secondary battery 63, a voltage conversion circuit 64, a charge control circuit 620, and a discharge control circuit 640.

The voltage conversion circuit 61 converts a voltage level of an output voltage of the rectifier circuit 50. The voltage conversion circuit 61 outputs the converted voltage to the charging circuit 62.

The charging circuit 62 generates a charging voltage from a DC voltage received from the voltage conversion circuit 61 and charges the secondary battery 63. At this time, the charging circuit 62 outputs a charging voltage in response to a charge control signal received from the charge control circuit 620. The charge control circuit 620 refers to, for example, a charge instruction from the short-range wireless communication IC 40 and generates a charge control signal. Here, the charging circuit 62 can also output the charging voltage to the voltage conversion circuit 64.

The voltage conversion circuit 64 converts a voltage level of an output voltage received from the charging circuit 62 or the secondary battery 63 into a voltage level for the short-range wireless communication IC 40. The voltage conversion circuit 64 supplies the converted voltage to the short-range wireless communication IC 40. At this time, the voltage conversion circuit 64 supplies the converted voltage to the short-range wireless communication IC 40 in response to a discharge control signal (power-supply control signal) received from the discharge control circuit 640. The discharge control circuit 640 refers to, for example, a charge instruction from the short-range wireless communication IC 40 and a monitoring state of a voltage level on a predetermined point of the load circuit 60 so as to generate a discharge control signal (power-supply control signal).

Example of Configuration of Short-Range Wireless Communication Device 10

Figure 7:
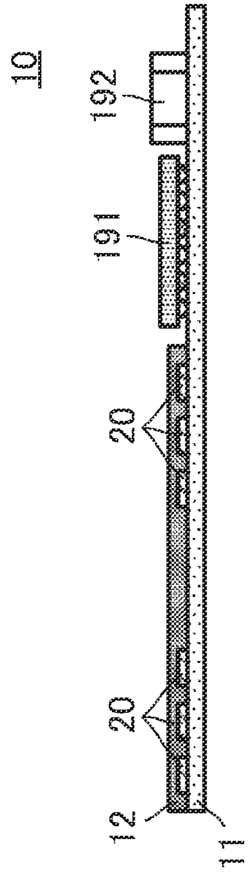
FIG. 7 is a side sectional view illustrating an example of a structure of a short-range wireless communication device according to the present disclosure.

FIG. 7 is a side sectional view illustrating an example of a structure of a short-range wireless communication device according to the present disclosure. As illustrated in FIG. 7, the short-range wireless communication device 10 includes a supporting base material 11, a magnetic sheet 12, the coil 20, an electronic component 191, and an electronic component 192. Here, FIG. 7 illustrates a single piece of electronic component 191 and a single piece of electronic component 192. However, the electronic component 191 and the electronic component 192 are provided in numbers so as to be able to constitute a circuit of the short-range wireless communication device 10.

The supporting base material 11 is a flat plate or a flat film, and a conductor pattern for realizing a circuit of the short-range wireless communication device 10 is formed on the supporting base material 11 mainly with an insulating material.

The coil 20 is composed of a wound-shaped linear conductor pattern formed by being wound in a predetermined number of times. The coil 20 is formed on one main surface of the supporting base material 11. The magnetic sheet 12 is arranged on one main surface of the supporting base material 11 so as to include a forming region of the coil 20.

The electronic component 191 is an electronic component having a solder bump formed on a mounting surface thereof. The electronic component 192 is an electronic component having terminal electrodes on both respective ends of a housing. The electronic component 191 is, for example, the short-range wireless communication IC 40, an IC of the rectifier circuit 50, or an IC of the load circuit 60. The electronic component 192 is, for example, the capacitor 21, the capacitor 22, various passive elements of the rectifier circuit 50, or various passive elements of the load circuit 60.

The electronic component 191 and the electronic component 192 are mounted on one main surface of the supporting base material 11. However, at least part of the electronic component 191 and the electronic component 192 may be mounted on the other main surface of the supporting base material 11.

This configuration allows the short-range wireless communication device 10 to be formed thin. Further, the provision of the magnetic sheet 12 realizes increase in the magnetic flux density of the coil 20. This realizes increase in power-receiving energy and communication energy in the short-range wireless communication device 10.

Here, the load circuit 60 does not have to include the secondary battery 63. However, provision of the secondary battery 63 allows the short-range wireless communication device 10 to store energy and realize stable operations of the short-range wireless communication IC 40, the load circuit 60, and the like.

Second Embodiment

Figure 8:
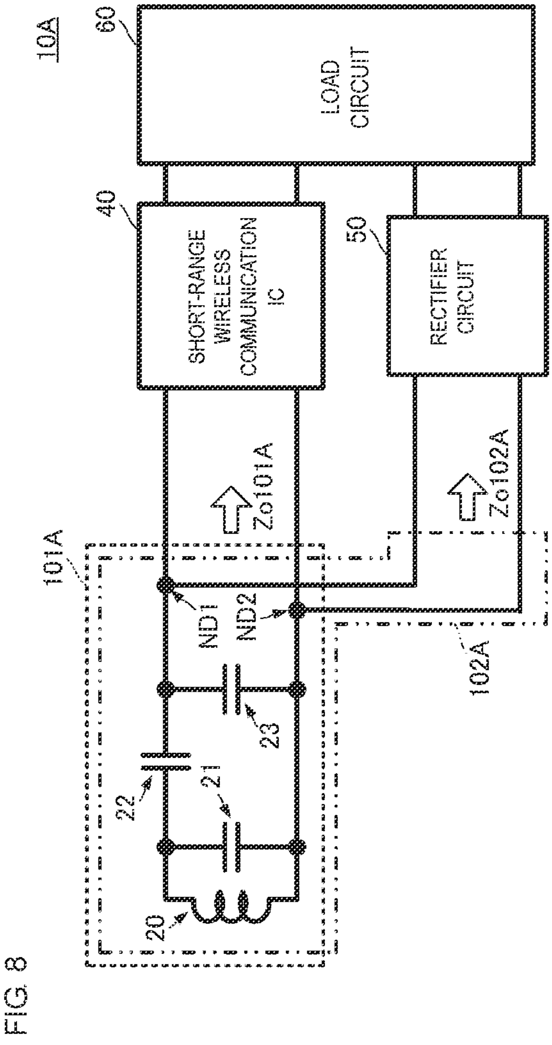
FIG. 8 is a functional block diagram illustrating a configuration of a short-range wireless communication device according to a second embodiment.

A short-range wireless communication device according to a second embodiment of the present disclosure will be described with reference to the accompanying drawings. FIG. 8 is a functional block diagram illustrating a configuration of the short-range wireless communication device according to the second embodiment.

As illustrated in FIG. 8, a short-range wireless communication device 10A according to the second embodiment is different from the short-range wireless communication device 10 according to the first embodiment in that the short-range wireless communication device 10A includes a receiving circuit 101A and a power-receiving circuit 102A. Other configurations of the short-range wireless communication device 10A are the same as those of the short-range wireless communication device 10 and the description of the same portions will be omitted.

The receiving circuit 101A and the power-receiving circuit 102A include the coil 20, the capacitor 21, the capacitor 22, and a capacitor 23, as a common circuit portion. The capacitor 23 is connected to a second parallel series resonance circuit composed of the coil 20, the capacitor 21, and the capacitor 22, in parallel. In other words, one end of the capacitor 23 is connected with the node ND1 and the other end is connected with the node ND2. Here, the capacitor 23 is connected closer to the coil 20, the capacitor 21, and the capacitor 22 than the pair of nodes ND1 and ND2.

In this configuration, the receiving circuit 101A and the power-receiving circuit 102A include a third parallel series parallel resonance circuit composed of the coil 20, the capacitor 21, the capacitor 22, and the capacitor 23. An output impedance Zo101A of the receiving circuit 101A and an output impedance Zo102A of the power-receiving circuit 102A are set by the first parallel resonance circuit, the second parallel series resonance circuit, and the third parallel series parallel resonance circuit.

The capacitor 23 for setting the output impedance Zo101A and the output impedance Zo102A is thus added. Accordingly, the short-range wireless communication device 10A can more securely set the output impedance Zo101A of the receiving circuit 101A and the output impedance Zo102A of the power-receiving circuit 102A to desired impedance. That is, the short-range wireless communication device 10A can more securely set the output impedance Zo101A of the receiving circuit 101A to the first desired value or higher and more securely set the output impedance Zo102A of the power-receiving circuit 102A to the second desired value or lower.

Third Embodiment

Figure 9:
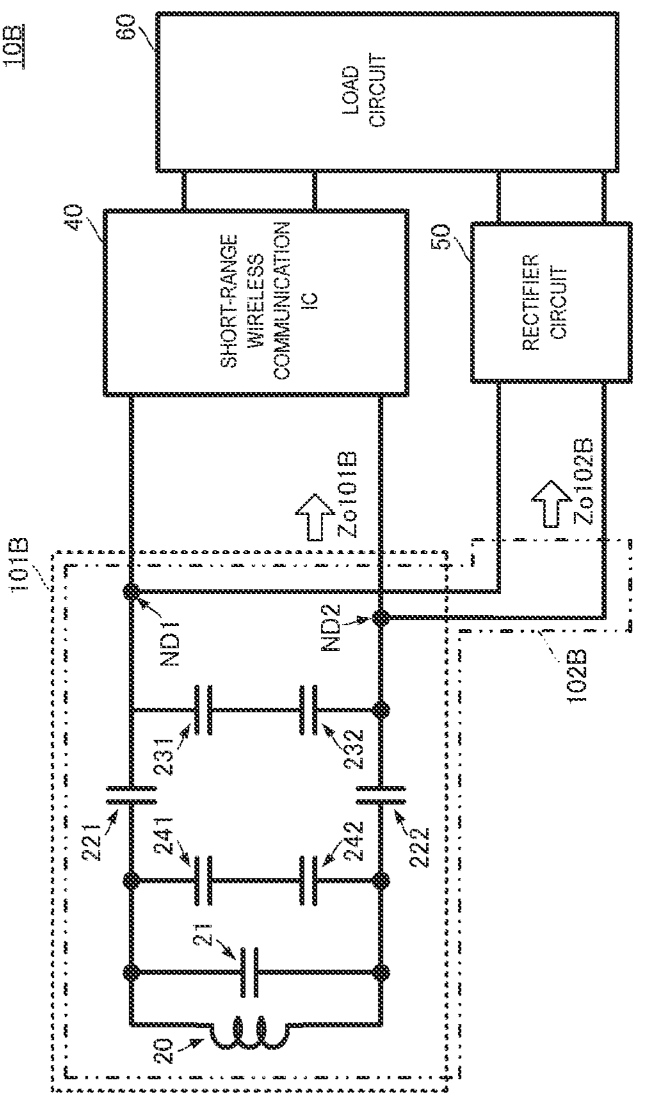
FIG. 9 is a functional block diagram illustrating a configuration of a short-range wireless communication device according to a third embodiment.

A short-range wireless communication device according to a third embodiment of the present disclosure will be described with reference to the accompanying drawings. FIG. 9 is a functional block diagram illustrating a configuration of the short-range wireless communication device according to the third embodiment.

As illustrated in FIG. 9, a short-range wireless communication device 10B according to the third embodiment is different from the short-range wireless communication device 10 according to the first embodiment in that the short-range wireless communication device 10B includes a receiving circuit 101B and a power-receiving circuit 102B. Other configurations of the short-range wireless communication device 10B are the same as those of the short-range wireless communication device 10 and the description of the same portions will be omitted.

The receiving circuit 101B and the power-receiving circuit 102B include the coil 20, the capacitor 21, a capacitor 221, a capacitor 222, a capacitor 231, a capacitor 232, a capacitor 241, and a capacitor 242, as a common circuit portion.

The capacitor 221 is connected between one end of the first parallel resonance circuit, composed of the coil 20 and the capacitor 21, and the node ND1. The capacitor 222 is connected between the other end of the first parallel resonance circuit, composed of the coil 20 and the capacitor 21, and the node ND2. The capacitance of the capacitor 221 and the capacitance of the capacitor 222 are the same as each other.

One end of a series circuit composed of the capacitor 231 and the capacitor 232 is connected with the node ND1, and the other end is connected with the node ND2. The capacitance of the capacitor 231 and the capacitance of the capacitor 232 are the same as each other.

A series circuit composed of the capacitor 241 and the capacitor 242 is connected in parallel to the first parallel resonance circuit. The capacitance of the capacitor 241 and the capacitance of the capacitor 242 are the same as each other.

In this configuration, the receiving circuit 101B and the power-receiving circuit 102B include a symmetric parallel series parallel resonance circuit composed of the coil 20 and the plurality of capacitors 21, 221, 222, 231, 232, 241, and 242. An output impedance Zo101B of the receiving circuit 101B and an output impedance Zo102B of the power-receiving circuit 102B are set by the first parallel resonance circuit, the second parallel series resonance circuit, and the symmetric parallel series parallel resonance circuit.

The capacitors for setting the output impedance Zo101B and the output impedance Zo102B are thus further added. Accordingly, the short-range wireless communication device 10B can more securely set the output impedance Zo101B of the receiving circuit 101B and the output impedance Zo102B of the power-receiving circuit 102B to desired impedance. That is, the short-range wireless communication device 10B can more securely set the output impedance Zo101B of the receiving circuit 101B to the first desired value or higher and more securely set the output impedance Zo102B of the power-receiving circuit 102B to the second desired value or lower.

Fourth Embodiment

Figure 10:
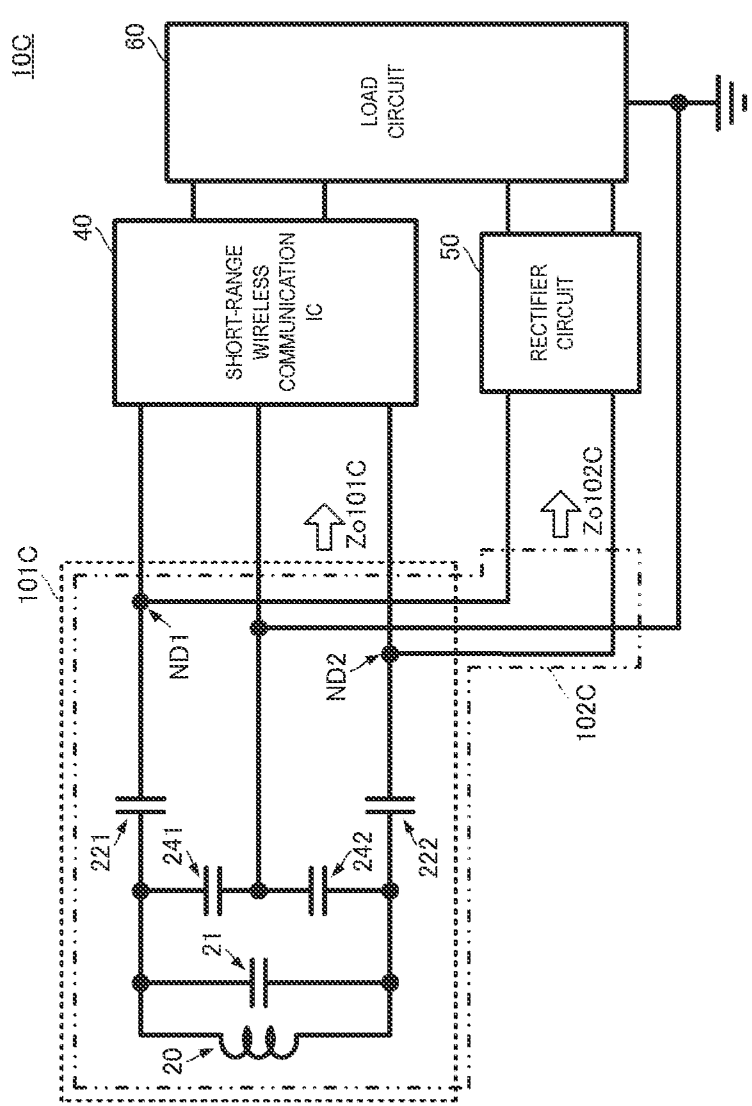
FIG. 10 is a functional block diagram illustrating a configuration of a short-range wireless communication device according to a fourth embodiment.

A short-range wireless communication device according to a fourth embodiment of the present disclosure will be described with reference to the accompanying drawings. FIG. 10 is a functional block diagram illustrating a configuration of the short-range wireless communication device according to the fourth embodiment.

As illustrated in FIG. 10, a short-range wireless communication device 10C according to the fourth embodiment is different from the short-range wireless communication device 10 according to the first embodiment in that the short-range wireless communication device 10C includes a receiving circuit 101C and a power-receiving circuit 102C. Other configurations of the short-range wireless communication device 10C are the same as those of the short-range wireless communication device 10 and the description of the same portions will be omitted.

The receiving circuit 101C and the power-receiving circuit 102C include the coil 20, the capacitor 21, the capacitor 221, the capacitor 222, the capacitor 241, and the capacitor 242, as a common circuit portion.

The capacitor 221 is connected between one end of the first parallel resonance circuit, composed of the coil 20 and the capacitor 21, and the node ND1. The capacitor 222 is connected between the other end of the first parallel resonance circuit, composed of the coil 20 and the capacitor 21, and the node ND2. The capacitance of the capacitor 221 and the capacitance of the capacitor 222 are the same as each other.

A series circuit composed of the capacitor 241 and the capacitor 242 is connected in parallel to the first parallel resonance circuit. The capacitance of the capacitor 241 and the capacitance of the capacitor 242 are the same as each other.

A node between the capacitor 241 and the capacitor 242 is connected to a ground terminal of the short-range wireless communication IC 40. Further, a transmission line connecting the node between the capacitor 241 and the capacitor 242 with the ground terminal of the short-range wireless communication IC 40 is connected to a ground potential.

In this configuration, the common circuit portion of the receiving circuit 101C and the power-receiving circuit 102C includes a resonance circuit which is composed of the coil 20 and the plurality of capacitors 21, 221, 222, 241, and 242 and has a symmetrical shape to the ground. An output impedance Zo101C of the receiving circuit 101C and an output impedance Zo102C of the power-receiving circuit 102C are set by the first parallel resonance circuit, the second parallel series resonance circuit, and the parallel resonance circuit which has the symmetrical shape to the ground.

Accordingly, the short-range wireless communication device 10C can more securely set the output impedance Zo101C of the receiving circuit 101C to the first desired value or higher and more securely set the output impedance Zo102C of the power-receiving circuit 102C to the second desired value or lower, as is the case with each embodiment described above.

Fifth Embodiment

Figure 11:
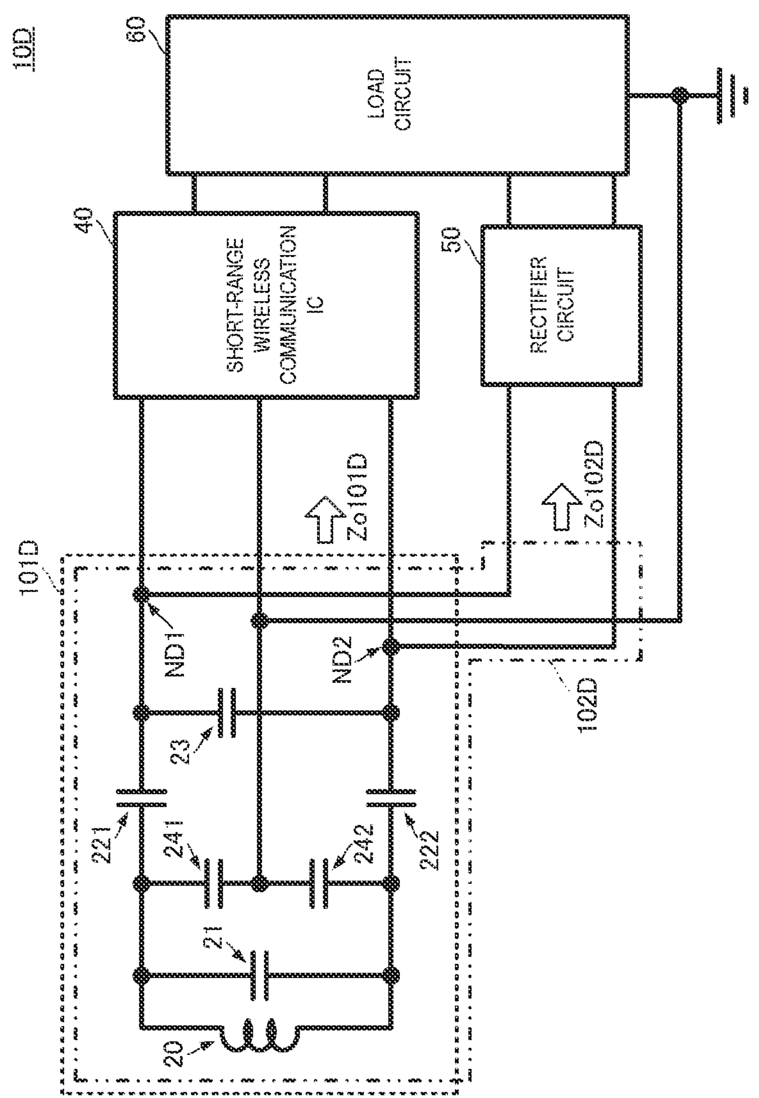
FIG. 11 is a functional block diagram illustrating a configuration of a short-range wireless communication device according to a fifth embodiment.

A short-range wireless communication device according to a fifth embodiment of the present disclosure will be described with reference to the accompanying drawings. FIG. 11 is a functional block diagram illustrating a configuration of the short-range wireless communication device according to the fifth embodiment.

As illustrated in FIG. 11, a short-range wireless communication device 10D according to the fifth embodiment is different from the short-range wireless communication device 10C according to the fourth embodiment in that the short-range wireless communication device 10D includes a receiving circuit 101D and a power-receiving circuit 102D. Other configurations of the short-range wireless communication device 10D are the same as those of the short-range wireless communication device 10C and the description of the same portions will be omitted.

A common circuit portion of the receiving circuit 101D and the power-receiving circuit 102D is different from the common circuit portion of the receiving circuit 101C and the power-receiving circuit 102C in that the common circuit portion of the receiving circuit 101D and the power-receiving circuit 102D further includes the capacitor 23. Other configurations in the common circuit portion of the receiving circuit 101D and the power-receiving circuit 102D are the same as those of the common circuit portion of the receiving circuit 101C and the power-receiving circuit 102C and the description of the same portions will be omitted.

The capacitor 23 is connected in parallel to the second parallel series resonance circuit composed of the coil 20, the capacitor 21, and the capacitor 23. That is, one end of the capacitor 23 is connected with the node ND1 and the other end is connected with the node ND2. At this time, the capacitor 23 is connected closer to the coil 20, the capacitor 21, and the capacitor 22 than the pair of nodes ND1 and ND2.

Accordingly, the short-range wireless communication device 10D can more securely set an output impedance Zo101D of the receiving circuit 101D to the first desired value or higher and more securely set an output impedance Zo102D of the power-receiving circuit 102D to the second desired value or lower, as is the case with each embodiment described above.

Sixth Embodiment

Figure 12:
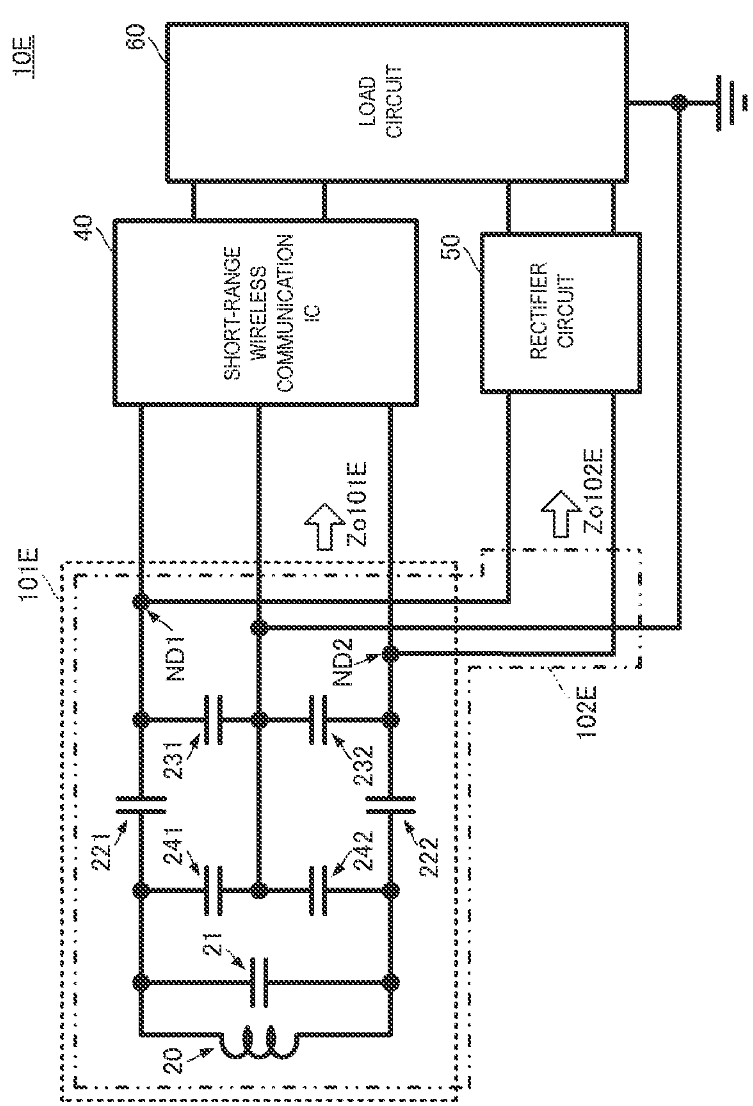
FIG. 12 is a functional block diagram illustrating a configuration of a short-range wireless communication device according to a sixth embodiment.

A short-range wireless communication device according to a sixth embodiment of the present disclosure will be described with reference to the accompanying drawings. FIG. 12 is a functional block diagram illustrating a configuration of the short-range wireless communication device according to the sixth embodiment.

As illustrated in FIG. 12, a short-range wireless communication device 10E according to the sixth embodiment is different from the short-range wireless communication device 10C according to the fourth embodiment in that the short-range wireless communication device 10E includes a receiving circuit 101E and a power-receiving circuit 102E. Other configurations of the short-range wireless communication device 10E are the same as those of the short-range wireless communication device 10C and the description of the same portions will be omitted.

A common circuit portion of the receiving circuit 101E and the power-receiving circuit 102E is different from the common circuit portion of the receiving circuit 101C and the power-receiving circuit 102C in that the common circuit portion of the receiving circuit 101E and the power-receiving circuit 102E further includes the capacitor 231 and the capacitor 232. Other configurations in the common circuit portion of the receiving circuit 101E and the power-receiving circuit 102E are the same as those of the common circuit portion of the receiving circuit 101C and the power-receiving circuit 102C and the description of the same portions will be omitted.

One end of a series circuit composed of the capacitor 231 and the capacitor 232 is connected with the node ND1, and the other end is connected with the node ND2. The capacitance of the capacitor 231 and the capacitance of the capacitor 232 are the same as each other. The node between the capacitor 231 and the capacitor 232 is connected to a transmission line connecting the node between the capacitor 241 and the capacitor 242 with the ground terminal of the short-range wireless communication IC 40.

Accordingly, the short-range wireless communication device 10E can more securely set an output impedance Zo101E of the receiving circuit 101E to the first desired value or higher and more securely set an output impedance Zo102E of the power-receiving circuit 102E to the second desired value or lower, as is the case with each embodiment described above.

In the configuration of each embodiment described above, the communication frequency fc and the power-receiving frequency fp are the same as each other. However, the above-mentioned advantageous effects can be obtained if the output impedance of the receiving circuit is higher than or equal to the first desired value and the output impedance of the power-receiving circuit is lower than or equal to the second desired value, as described above, even when the communication frequency fc and the power-receiving frequency fp are different from each other.

Further, when the communication frequency fc and the power-receiving frequency fp are different from each other, it is preferable that at least part of the communication frequency band including the communication frequency fc and part of the power-receiving frequency band including the power-receiving frequency fp overlap with each other. This makes it possible to more securely realize the condition that the output impedance of the receiving circuit is higher than or equal to the first desired value and the output impedance of the power-receiving circuit is lower than or equal to the second desired value.

What is claimed is:

1. A short-range wireless communication device having a power-receiving function, the short-range wireless communication device comprising:

- a power-receiving coil configured for both power reception in wireless power supply utilizing short-range radio and reception in wireless data communication utilizing the short-range radio;
- a power-receiving resonance circuit in which the power-receiving coil and two or more resonance capacitors configure a resonance circuit; and
- a wireless communication circuit and a load circuit each of which is electrically connected with the power-receiving resonance circuit, the load circuit being configured to perform an operation using electric power, and the load circuit includes a voltage conversion circuit, a charging circuit, a secondary battery, a voltage conversion circuit, a charge control circuit and a discharge control circuit, wherein
- the power-receiving resonance circuit includes
  - a receiving circuit configured to supply a communication voltage to the wireless communication circuit from the power-receiving coil, and
  - a power-receiving circuit configured to supply a power-reception current to the load circuit from the power-receiving coil, the receiving circuit and the power-receiving circuit have a common circuit portion, the two or more resonance capacitors include a first resonance capacitor and a second resonance capacitor in the common circuit portion, the first resonance capacitor is electrically connected in parallel to the power-receiving coil to configure a parallel resonance circuit together with the power-receiving coil, and the parallel resonance circuit is configured to perform a parallel resonance operation at a frequency of an alternating magnetic field of an outside, the second resonance capacitor is electrically connected in series to the power-receiving coil to configure a parallel series resonance circuit together with the power-receiving coil and the first resonance capacitor, and the parallel series resonance circuit is configured to perform a parallel series resonance operation at the frequency of the alternating magnetic field of the outside, and with an impedance adjusting circuit including the parallel resonance circuit and the parallel series resonance circuit, a wireless-communication output impedance of the receiving circuit with respect to the wireless communication circuit at a communication frequency is higher than or equal to a first predetermined value for realizing load modulation, and a power-reception output impedance of the power-receiving circuit with respect to the load circuit at a power-receiving frequency is lower than or equal to a second predetermined value for realizing power supply, and operations of both of the receiving circuit and the power-receiving circuit are performed in parallel.

2. The short-range wireless communication device according to claim 1, wherein the communication frequency and the power-receiving frequency are the same as each other, and the second predetermined value is larger than the first predetermined value.

3. The short-range wireless communication device according to claim 1, wherein the power-receiving resonance circuit configures a symmetric resonance circuit with respect to a reference potential.

4. The short-range wireless communication device according to claim 1, wherein a frequency band of the alternating magnetic field is an ISM band.

5. The short-range wireless communication device according to claim 4, wherein the frequency band of the alternating magnetic field is 6.78 MHz or 13.56 MHz.

6. The short-range wireless communication device according to claim 1, wherein capacitance of the second resonance capacitor is smaller than capacitance of the first resonance capacitor.

7. The short-range wireless communication device according to claim 1, further comprising:

a supporting base material configured to support the power-receiving coil and the power-receiving resonance circuit, wherein the power-receiving coil and the power-receiving resonance circuit are on the same plane.

8. The short-range wireless communication device according to claim 7, further comprising:

a magnetic sheet that overlaps with the power-receiving coil.

9. The short-range wireless communication device according to claim 1, wherein a change rate of an impedance of the receiving circuit in load modulation in the wireless communication is set to 30% or higher.

10. The short-range wireless communication device according to claim 2, wherein the power-receiving resonance circuit configures a symmetric resonance circuit with respect to a reference potential.

11. The short-range wireless communication device according to claim 2, wherein a frequency band of the alternating magnetic field is an ISM band.

12. The short-range wireless communication device according to claim 3, wherein a frequency band of the alternating magnetic field is an ISM band.

13. The short-range wireless communication device according to claim 2, wherein capacitance of the second resonance capacitor is smaller than capacitance of the first resonance capacitor.

14. The short-range wireless communication device according to claim 3, wherein capacitance of the second resonance capacitor is smaller than capacitance of the first resonance capacitor.

15. The short-range wireless communication device according to claim 2, further comprising:

a supporting base material configured to support the power-receiving coil and the power-receiving resonance circuit, wherein the power-receiving coil and the power-receiving resonance circuit are on the same plane.

16. The short-range wireless communication device according to claim 3, further comprising:

a supporting base material configured to support the power-receiving coil and the power-receiving resonance circuit, wherein the power-receiving coil and the power-receiving resonance circuit are on the same plane.

17. The short-range wireless communication device according to claim 2, wherein a change rate of an impedance of the receiving circuit in load modulation in the wireless communication is set to 30% or higher.

* * * * *